US012563056B2

(12) United States Patent
Sledge et al.

(10) Patent No.: US 12,563,056 B2
(45) Date of Patent: Feb. 24, 2026

(54) SYSTEM AND METHOD FOR MONITORING AND MANAGING COMPUTING ENVIRONMENT

(71) Applicant: imPAC Labs, Atlanta, GA (US)

(72) Inventors: Brian Sledge, Keller, TX (US); Thinh Le, Jacksonville, FL (US); Ramond C Edwards, III, Cumming, GA (US)

(73) Assignee: imPAC Labs, Atlanta, GA (US)

( * ) Notice: Subject to any disclaimer, the term of this patent is extended or adjusted under 35 U.S.C. 154(b) by 0 days.

(21) Appl. No.: 18/542,786

(22) Filed: Dec. 18, 2023

(65) Prior Publication Data

US 2025/0202908 A1     Jun. 19, 2025

(51) Int. Cl.
H04L 9/00 (2022.01)
H04L 9/40 (2022.01)

(52) U.S. Cl.
CPC .......... H04L 63/1416 (2013.01); H04L 63/20 (2013.01)

(58) Field of Classification Search
CPC ........................... H04L 63/1416; H04L 63/20
USPC ........................................................ 726/23
See application file for complete search history.

(56) References Cited

U.S. PATENT DOCUMENTS

| | | | |
|---|---|---|---|
| 2017/0093902 A1* | 3/2017 | Roundy ................. | G06F 21/554 |
| 2019/0141079 A1* | 5/2019 | Vidas ......................... | G06N 7/01 |
| 2021/0194924 A1* | 6/2021 | Heinemeyer ......... | G06F 21/577 |
| 2023/0267782 A1* | 8/2023 | Ucar ...................... | G06N 20/00 |
| | | | 701/31.7 |
| 2024/0031411 A1* | 1/2024 | Levari ................. | H04L 63/1416 |

* cited by examiner

*Primary Examiner* — Christopher J Brown
(74) *Attorney, Agent, or Firm* — Jose Cherson Weissbrot

(57) ABSTRACT

A method for monitoring and managing a computing environment is described. The method comprises monitoring events performed in the computing environment based on a set of policies. The set of policies is defined to identify non-compliance or a malicious behavior associated with the events. The events are evaluated with respect to configuration information related to resources of the computing environment. The configuration information comprises a pattern configuration and an outcome configuration. The pattern configuration indicates a scope of the one or more resources, conditions of the non-compliance or the malicious behavior, and actions for each type of the non-compliance or the malicious behavior. The outcome configuration indicates objectives measured within a timeframe specified for a desired outcome. The set of policies is dynamically updated based on the evaluation of the events. The updated set of policies is stored in a shared database of the computing environment.

20 Claims, 8 Drawing Sheets

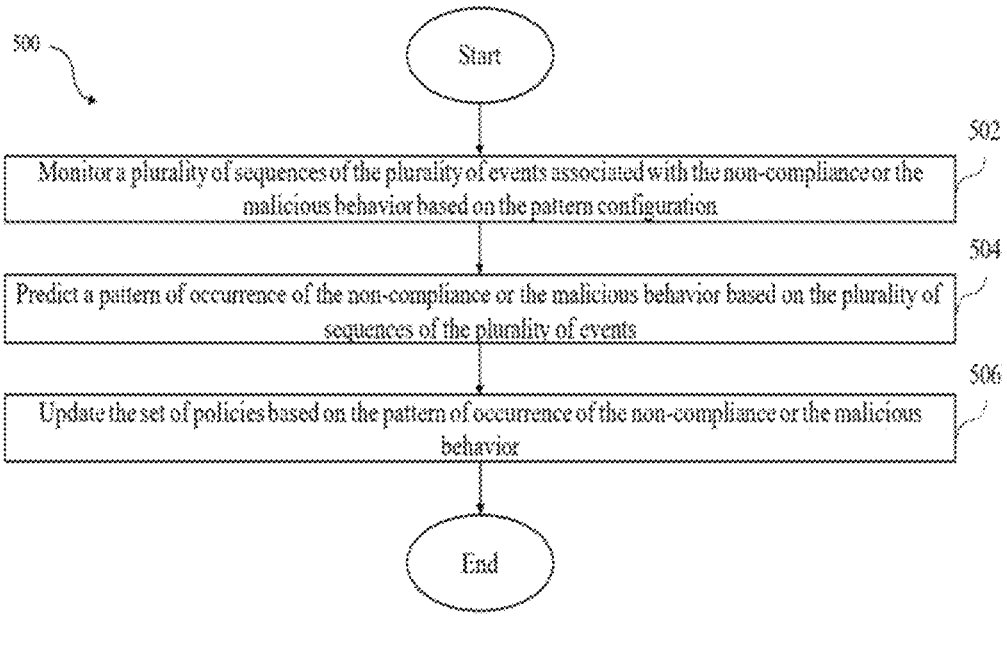

500

Start

502

Monitor a plurality of sequences of the plurality of events associated with the non-compliance or the malicious behavior based on the pattern configuration

504

Predict a pattern of occurrence of the non-compliance or the malicious behavior based on the plurality of sequences of the plurality of events

506

Update the set of policies based on the pattern of occurrence of the non-compliance or the malicious behavior End

FIG. 5

SYSTEM AND METHOD FOR MONITORING AND MANAGING COMPUTING ENVIRONMENT

FIELD OF THE INVENTION

The present invention relates to monitoring for a network including a plurality of entities, and particularly to a system and method for monitoring and managing a computing environment to ensure compliance with a set of policies.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

A network generally includes a communication link and various devices connected to the communication link and having a communication capability. In this case, the devices related to the network include a computer, a peripheral device, a router, a storage device, a processor and several electrical products having communication interfaces. In this case, the term "device" typically includes logical devices or other devices capable of processing and exchanging functionality and data, and may include household appliances and computers for common purposes.

Private networks are at risk to directed attacks that attempt to overwhelm services, discover passwords and other valuable information, and otherwise misuse private network resources. The difficulty in detecting and mitigating these attacks is especially challenging when one considers the ever increasing use of the remote work place, and other cross-business "trusted" network connections that make it difficult to maintain a defined and pervasive "firewall" at network boundaries.

Various techniques have evolved in part to cope with these challenges. One example of the conventional techniques is security and compliance frameworks, such as Control Objectives for Information and Related Technologies (COBIT), InfoSec, and Center for Internet Security (CIS)/Cloud Security Alliance (CSA). Such frameworks utilize a structured set of guidelines and best practices designed to assist organizations in developing, implementing, and maintaining a comprehensive IT governance and management framework. However, such frameworks provide a static set of guidelines that don't adapt in real-time to emerging threats or changing environments. Further, implementing and maintaining compliance with these frameworks requires significant manual effort, making them less agile. These framework don't offer real-time threat detection or adaptive response mechanisms. In addition, while these frameworks provide a general direction, they often lack the granularity needed for specific scenarios or rapidly changing tech environments.

Another example of the conventional techniques is rule based security systems. Such systems operate based on predefined rules or signatures to detect and respond to known threats. However, such systems can only detect threats that have a known signature or fit a predefined rule. Further, due to their rigid nature, they often generate false alarms, leading to unnecessary resource allocation. In addition, such systems are reactive in nature, acting only after a threat matches a known signature.

Yet another example of the conventional techniques is manual compliance audits. In such audits, periodically check conducted manually or with minimal automation to ensure that an organization's IT infrastructure adheres to regulatory and internal standards. However, manual audits are resource-intensive and can take significant time, leading to potential gaps in security during the interim. Further, being manual, such audits are susceptible to oversights and errors. In addition, Such audits provide a snapshot of compliance at a particular time, rather than continuous monitoring.

Still another example of the conventional techniques is traditional firewalls and Intrusion Detection Systems (IDS). Such techniques utilize hardware or software-based systems designed to monitor and filter incoming and outgoing network traffic based on an organization's previously established security policies. However, these techniques focus on defending the perimeter, often missing lateral movements or threats that bypass the perimeter. In addition, while these techniques can block or alert on suspicious traffic, they often lack the capability to provide deep insights into the nature or intent of the threat.

As explained heretofore, conventional techniques for organizing computing networks are reactive, rigid, and lacked the adaptability required in today's dynamic technological landscapes. Thus, there is a need for real-time adaptability, continuous monitoring, and proactive threat management technique, which overcomes shortcomings of conventional techniques.

SUMMARY OF THE INVENTION

The present invention relates to a system for managing computing network. The objective of the invention is to monitor and manage a computer environment to ensure compliance and non-malicious behavior based on a set of policies that keep on updating dynamically on a real-time basis.

According to an embodiment of the present disclosure, a method for monitoring and managing a computing environment is disclosed. The method comprises monitoring events performed in the computing environment based on a set of policies. The set of policies is defined to identify non-compliance or a malicious behavior associated with the events. The events are evaluated with respect to configuration information related to resources of the computing environment. The configuration information comprises a pattern configuration and an outcome configuration. The pattern configuration indicates a scope of the one or more resources, conditions of the non-compliance or the malicious behavior, and actions for each type of the non-compliance or the malicious behavior. The outcome configuration indicates objectives measured within a timeframe specified for a desired outcome. The set of policies is dynamically updated based on the evaluation of the events. The updated set of policies is stored in a shared database of the computing environment.

In an aspect, the plurality of events comprises at least one of operational events, business events, regulatory events, security events, finops events, and user-initiated events.

In an aspect, the pattern configuration and the outcome configuration are defined by an owner of the computing environment.

In an aspect, the method further comprises monitoring a plurality of sequences of the plurality of events associated with the non-compliance or the malicious behavior based on the pattern configuration. A pattern of occurrence of the non-compliance or the malicious behavior is predicted based on the plurality of sequences of the plurality of events. The set of policies is updated based on the pattern of occurrence of the non-compliance or the malicious behavior.

In an aspect, the pattern of occurrence of the non-compliance or the malicious behavior is utilized for training of a data model.

In an aspect, the method further comprises acquiring a desired output of execution of the plurality of events based on the outcome configuration. An actual output of execution of the plurality of events is matched with the desired output. A metric value is determined based on the matching of the actual output of the execution with the desired output of the execution. The metric value is compared with a pre-defined threshold value. The set of policies is updated based on the comparison of the metric value with the pre-defined threshold value.

In an aspect, the metric value is calculated within a specified time period.

In an aspect, the outcome configuration is updated based on a result of the evaluation of the plurality of events using the pattern configuration.

In an aspect, the method further comprises receiving a policy update associated with the set of policies from an automated monitoring system or an owner of the computing environment. The set of defined policies is updated based on the policy update.

In an aspect, the set of policies are updated dynamically using real time data associated with patterns of the behaviors and the desired outcome of the plurality of events.

In an aspect, the shared database is communicatively coupled with one or more third-party systems for obtaining behaviors of the plurality of events.

In an aspect, a result of evaluation of the plurality of events with respect to the pattern configuration depends on an output of the evaluation of the plurality of events with respect to the outcome configuration.

In an aspect, a result of evaluation of the plurality of events with respect to the outcome configuration depends on an output of the evaluation of the plurality of events with respect to the pattern configuration.

According to an embodiment of the present disclosure, a system for monitoring and managing a computing environment is disclosed. The system comprises one or more data processors and a memory comprising instructions which, when executed on the one or more data processors, cause the one or more data processors to monitor events performed in the computing environment based on a set of policies. The set of policies is defined to identify non-compliance or a malicious behavior associated with the events. The events are evaluated with respect to configuration information related to resources of the computing environment. The configuration information comprises a pattern configuration and an outcome configuration. The pattern configuration indicates a scope of the one or more resources, conditions of the non-compliance or the malicious behavior, and actions for each type of the non-compliance or the malicious behavior. The outcome configuration indicates objectives measured within a timeframe specified for a desired outcome. The set of policies is dynamically updated based on the evaluation of the events. The updated set of policies is stored in a shared database of the computing environment.

In an aspect, the metric value is calculated within a specified time period.

In an aspect, the outcome configuration is updated based on a result of the evaluation of the plurality of events using the pattern configuration.

In an aspect, the one or more data processors are configured to receive a policy update associated with the set of policies from an automated monitoring system or an owner of the computing environment. The set of defined policies is updated based on the policy update.

In an aspect, the set of policies are updated dynamically using real time data associated with patterns of the behaviors and the desired outcome of the plurality of events.

In an aspect, the shared database is communicatively coupled with one or more third-party systems for obtaining behaviors of the plurality of events.

In an aspect, a result of evaluation of the plurality of events with respect to the pattern configuration depends on an output of the evaluation of the plurality of events with respect to the outcome configuration.

In an aspect, a result of evaluation of the plurality of events with respect to the outcome configuration depends on an output of the evaluation of the plurality of events with respect to the pattern configuration.

According to an embodiment of the present disclosure, a non-transitory computer readable medium for monitoring and managing a computing environment is disclosed. The non-transitory computer readable medium comprises instructions configured to cause one or more data processors to monitor events performed in the computing environment based on a set of policies. The set of policies is defined to identify non-compliance or a malicious behavior associated with the events. The events are evaluated with respect to configuration information related to resources of the computing environment. The configuration information comprises a pattern configuration and an outcome configuration. The pattern configuration indicates a scope of the one or more resources, conditions of the non-compliance or the malicious behavior, and actions for each type of the non-compliance or the malicious behavior. The outcome configuration indicates objectives measured within a timeframe specified for a desired outcome. The set of policies is dynamically updated based on the evaluation of the events. The updated set of policies is stored in a shared database of the computing environment.

BRIEF DESCRIPTION OF DRAWINGS

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 5 illustrates a flow chart of a method for evaluation of the plurality of events by the pattern-based control module, according to an embodiment of the present invention

Figure 1:
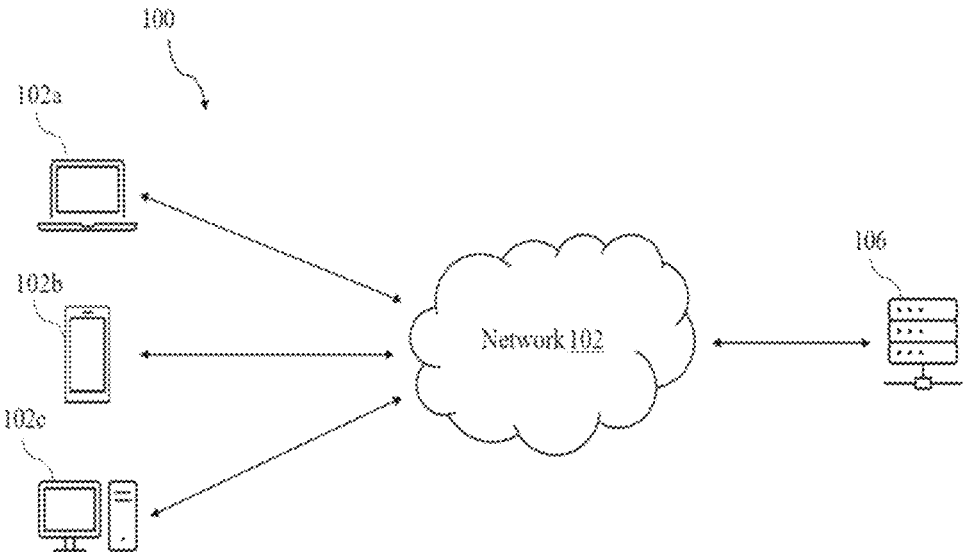
FIG. 1 illustrates a simplified diagram illustrating a computing environment, in accordance with an embodiment of present invention.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings, and specific language will be used to describe the same. It will nevertheless be understood that no limitation of the scope of the invention is thereby intended. Such alterations and further modifications in the illustrated system, and such further applications of the principles of the invention as illustrated therein would be contemplated as would normally occur to one skilled in the art to which the invention relates. Unless otherwise defined, all technical and scientific terms used herein have the same meaning as commonly understood by one of ordinary skilled in the art. The system, methods, and examples provided herein are illustrative only and are not intended to be limiting.

The term "some" as used herein is to be understood as "none or one or more than one or all." Accordingly, the terms "none," "one," "more than one," "more than one, but not all" or "all" would all fall under the definition of "some." The term "some embodiments" may refer to no embodiments or to one embodiment or to several embodiments or to all embodiments, without departing from the scope of the present disclosure.

The terminology and structure employed herein is for describing, teaching, and illuminating some embodiments and their specific features. It does not in any way limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below. Embodiments of the present invention will be described below in detail with reference to the accompanying drawings.

The present invention relates to monitoring and managing a computing environment to ensure compliance with a set of policies. The compliance and security may be ensured using a dual-control system that seamlessly integrates pattern-based and outcome-based methodologies. Usage of the pattern-based and the outcome-based methodologies provides real-time responsiveness to threats and consistent alignment with desired compliance states in order to address dynamic and evolving nature of modern technological environments.

One or more embodiments of the present invention provide a method and a system for monitoring and managing the computing environment. A plurality of events, such as operational events, business events, regulatory events, security events, finops events, and user-initiated events may be monitored based on a set of policies. The set of policies may be defined to identify non-compliance or a malicious behavior associated with the plurality of events. The plurality of events may be evaluated with respect to configuration information related to one or more resources of the computing environment. The configuration information may comprise a pattern configuration indicating a scope of the one or more resources, conditions of the non-compliance or the malicious behavior, and actions for each type of the non-compliance or the malicious behavior. The outcome configuration may further comprise an outcome configuration indicating objectives measured within a timeframe specified for a desired outcome. Further, the set of policies may be dynamically updated based on the evaluation of the plurality of events. The updated set of policies may be stored in a shared database of the computing environment.

FIG. 1 illustrates a simplified diagram illustrating a computing environment 100, in accordance with an embodiment of present t invention. The computing environment 100 comprises various computing systems (e.g., servers and devices) interconnected by a wireless or wired network 102. The network 102 may comprise any combination of a wide area network (e.g. WAN), local area network (e.g. LAN), cellular network, wireless LAN (e.g. WLAN), or any such means for enabling communication of computing systems. The network 102 may be any type of network familiar to those skilled in the art that can support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The computing environment 100 may comprise at least one instance of a user device 104. The user device 104 may represent one of a variety of other computing devices (e.g., a laptop computer 104 a, a smart phone 104 b, a desktop computer 104 c, an IP phone, a tablet, etc.) having hardware and software (e.g. web browser application) capable of processing and displaying information (e.g., web page, graphical user interface, etc.), and communicating information (e.g., web page request, user activity, campaign settings, etc.) over the network 102.

The user device 104 may include various types of computing systems such as PA devices, portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, internet-enabled gaming devices (e.g., a Microsoft Xbox® gaming console with or without a Kinect® gesture input device, Sony Play Station® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

The computing environment 100 may further comprise a data management server (DMS) 106. The DMS may comprise one or more processors for monitoring and managing the network 102. The DMS 106 may represent any single computing system with dedicated hardware and software, multiple computing systems clustered together (e.g., a server farm), a portion of shared resources on one or more computing systems (e.g., virtual server), or any combination thereof.

The DMS 106 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The DMS 106 can include one or more virtual machines running virtual operating systems, or other computing architectures involving virtualization such as one or more flexible pools of logical storage devices that can be virtualized to maintain virtual storage devices for the server. In various embodiments, the DMS 106 may be adapted to run one or more services or software applications that provide the functionality described in the foregoing disclosure.

The computing systems in the DMS 106 may run one or more operating systems including any of those discussed above, as well as any commercially available server operating system. The DMS 106 may also run any of a variety of additional server applications and/or mid-tier applications, including HTTP (hypertext transport protocol) servers, FTP (file transfer protocol) servers, CGI (common gateway interface) servers, JAVAR servers, database servers, and the like. Exemplary database servers include without limitation those commercially available from Oracle®, Microsoft®, Sybase®, IBM® (International Business Machines), and the like.

In one embodiment, the DMS 106 may manage a plurality of events performed by the user device 104 in the computing environment 100. For example, the user device 104 may initiate a browsing session by sending a browsing request the network 102. Any activity of the user on the user device 104 can initiate sending of user data and event information to the DMS 106. The DMS 106 may monitor the plurality of events based on a set of policies. The set of policies may be defined to identify non-compliance or a malicious behavior associated with the plurality of events. In some embodiments, the plurality of events may comprise at least one of operational events, business events, regulatory events, security events, finops events, and user-initiated events.

The plurality of events may be evaluated with respect to configuration information related to one or more resources of the computing environment 100. The configuration information may comprise a pattern configuration indicating a scope of the one or more resources, conditions of the non-compliance or the malicious behavior, and actions for each type of the non-compliance or the malicious behavior. The configuration information may further comprise an outcome configuration indicating objectives measured within a timeframe specified for a desired outcome. In some embodiments, the pattern configuration and the outcome configuration are defined by an owner of the computing environment 100. Further, the set of policies may be dynamically updated based on the evaluation of the plurality of events. The set of policies may be stored in a shared database of the computing environment 100.

Figure 2:
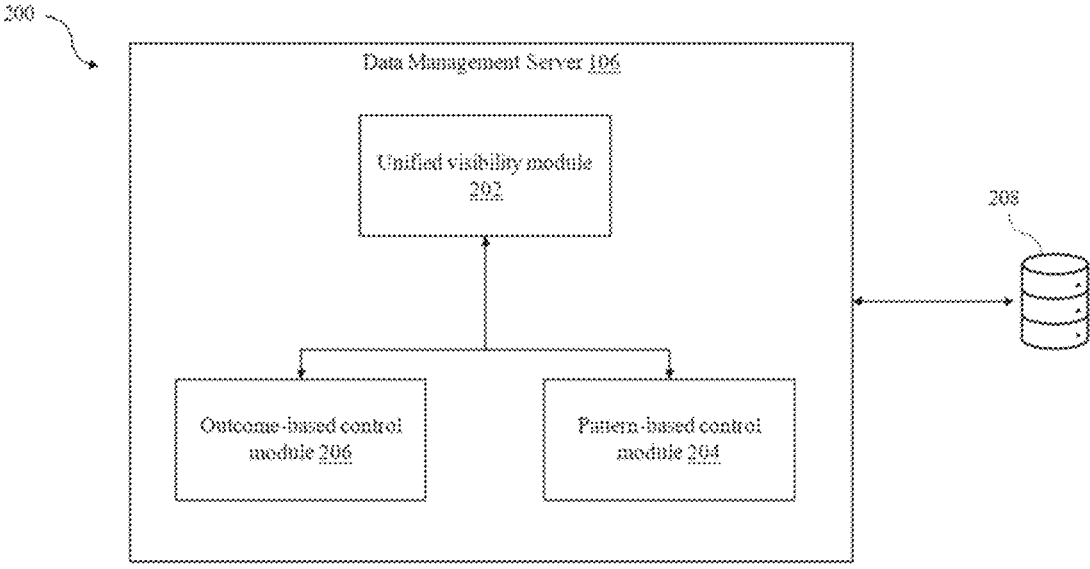
FIG. 2 illustrates a simplified diagram illustrating a system for monitoring and managing the computing environment, in accordance with an embodiment of present invention.

FIG. 2 illustrates a simplified diagram illustrating a system 200 for monitoring and managing the computing environment 100, in accordance with an embodiment of present invention. The system 200 may comprise the DMS 106 for processing the data of the user. The DMS 106 controls the operation of the computing environment 100 and may comprise one or more processors, application specific integrated circuits (ASICs), or field programmable gate arrays (FPGAs). The processors may include be single core or multicore processors. The processing resources of the computing environment 100 can be organized into one or more processing units. A processing unit may include one or more processors, one or more cores from the same or different processors, a combination of cores and processors, or other combinations of cores and processors. In some embodiments, processing subsystem can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in the DMS 106 can execute instructions stored in system memory or on computer-readable storage media. In various embodiments, the processing units can execute a variety of programs or code instructions and can maintain multiple concurrently executing programs or processes. At any given time, some or all of the program code to be executed can be resident in system memory and/or on computer-readable storage media including potentially on one or more storage devices. Through suitable programming, the DMS 106 can provide various functionalities described above. In instances where the computing environment 100 is executing one or more virtual machines, one or more processing units may be allocated to each virtual machine.

In some embodiments, the DMS 106 may comprise a unified visibility module 202, a pattern-based control module 204, and an outcome-based control module 206. The unified visibility module 202, the pattern-based control module 204, and the outcome-based control module 206 may be interconnected with each other. In one implementation, these modules may be connected wirelessly. In another implementation, these modules may be connected through wired connection. The unified visibility module 202 may continuously scan the computing environment 100 to identify and catalog resources. During the scan, the unified visibility module 202 may capture details related to the state and configuration of each resource. In some implementations, the unified visibility module 202 may observe changes in the resources over time. It will also evaluate each resource against a set of predefined policies. In one implementation, these policies are defined based on industry standards. In another implementation, the policies are custom-defined.

Figure 3:
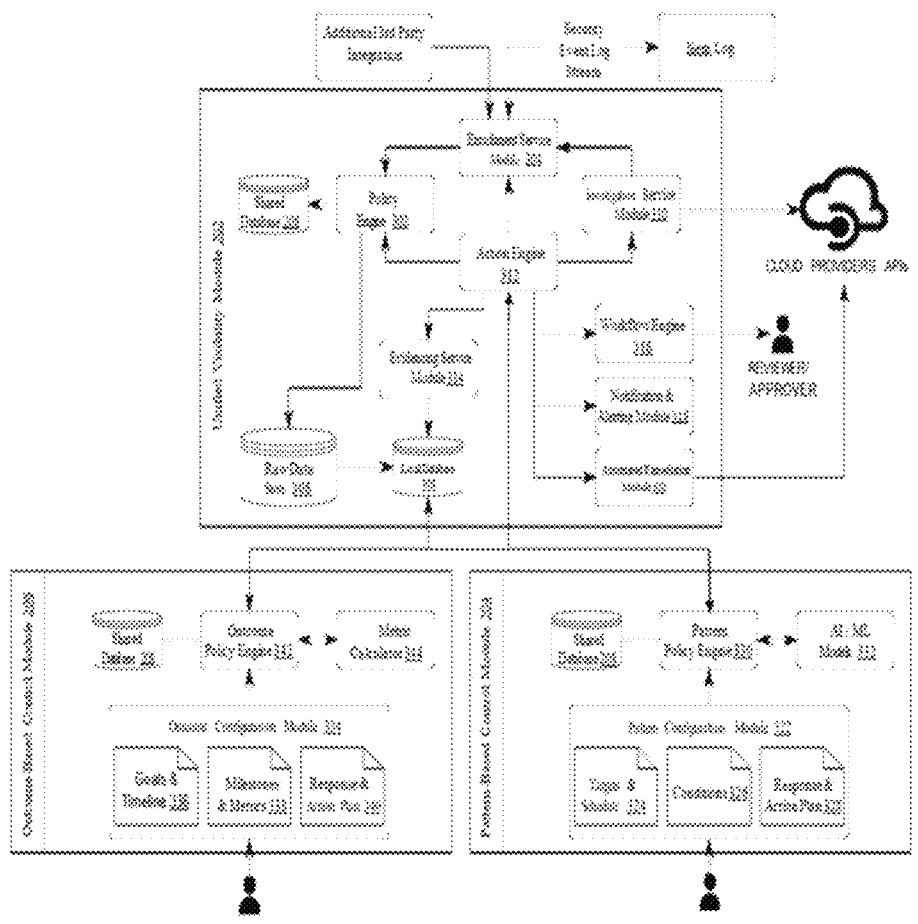
FIG. 3 illustrates block diagram illustrating the unified visibility module, the pattern-based control module, and the outcome-based control module, in accordance with an embodiment of present invention.

Functions and architecture of the unified visibility module 202 may be described in detail successively through FIG. 3.

The unified visibility module 202 may provide monitored data to the pattern-based control module 204. The pattern-based control module 204 may continuously analyze the data received from the unified visibility module 202 for identifying patterns or combinations of conditions indicating a security breach or compliance risk. Outcome of the pattern-based control module 204 may be shared with the unified visibility module 202 and the outcome-based control module 206. Functions and architecture of the pattern-based control module 204 may be described in detail successively through FIG. 3.

The unified visibility module 202 and the pattern-based control module 204 may provide their data to the outcome-based control module 206 through a shared database 208. The outcome-based control module 206 may operate at a higher level and may focus on the broader goals of the organization's risk, compliance, and security programs. The outcome-based control module 206 may aggregate data from the unified visibility module 202 and the pattern-based control module 204. Further, it may measure the integrated data against predefined metrics to track progress towards these goals. Functions and architecture of the outcome-based control module 206 may be described in detail successively through FIG. 3.

In some embodiments, the shared database 208 may comprise all the relevant information associated with outcomes of the pattern-based control module 204 and the outcome-based control module 206. For example, if the pattern-based control module 204 identified a malicious activity, it may observe the pattern of the events executed for the malicious activity and may store the pattern in the shared database 208. As a result, if similar activity is executed again in future, the unified visibility module 202 may fetch the patterns from the shared database 208 and may refrain from accessing the resources of the computing environment 100. Similarly, if the outcome-based control module 206 determines that the malicious activity is performed for a predefined number of times based on the data stored in the shared database 208, it may refrain from accessing the resources of the computing environment 100.

Based on the results of the pattern-based control module 204 and the outcome-based control module 206, the unified visibility module 202 may dynamically update the set of policies. The updated set of policies is stored in a shared database 208 of the computing environment 100. The shared database 208 may include non-transitory computer-readable storage media including storage media and a system memory.

FIG. 3 illustrates block diagram illustrating the unified visibility module 202, the pattern-based control module 204, and the outcome-based control module 206, in accordance with an embodiment of present invention. Each module of the computing environment 100 may comprise various submodules configured for performing different functionalities. The unified visibility module 202 may comprise a policy engine module 302 for accessing the set of policies stored in the shared database 208. The policy engine module 302 may further perform resource-level policy evaluation on the set of policies acquired from the shared database 208. The resource-level policy evaluation may evaluate the set of policies in accordance with the resources of the computing environment 100. The policy engine module 302 may further receive additional inputs from an enrichment service module 304. The enrichment service module 304 may provide additional security event and/or incident data post ingestion. In one implementation, the enrichment service module 304 may receive data from additional third-party tools integration for integrating the unified visibility module 202 with other third-party devices. The enrichment service module may further receive information from the Security Information and Event Management (SIEM) logs for providing additional security to the computing environment 100. The policy engine module 302 may receive the information from the enrichment service module 304 and may update the set of policies in the shared database 208 based on the information. In such way the security may be enhanced. In one implementation, the policy engine module 302 may further provide data related to the policies and the resources to a raw data store 306. The raw data store 306 may store all raw data required for updating policies. Further, the raw data may be stored in a local database 308 of the unified visibility module 202.

The unified visibility module 202 may further comprise an investigation service module 310 for collecting the resource and configuration related information from Cloud Services Platform (CSP) Application programming interfaces (APIs). Further, the investigation service module 310 may provide the resource and configuration related information to the enrichment service module 304.

The unified visibility module 202 may further comprise an action engine 312 for demonstrating orchestration and actions capabilities of the unified visibility module 202. The action engine 312 may control operations of one or more modules integrated to the unified visibility module 202. For example, the action engine 312 may allow, block, or partially allow access of resources of the computing environment 100.

The unified visibility module 202 may comprise an evidencing service module 314 configured to collect and store supporting log data that can be used to verify control effectiveness. The evidencing service module 314 may receive data related to verification of the request for access of the resources from the action engine 312. Further, the evidencing service module 314 may store the data into the local database 308.

The action engine 312 may further control one or more modules such as a workflow engine 316, a notification and alerting module 318, and an automated remediation module 320. For example, the action engine 312 may control the workflow engine 316 to perform the tasks according to the set of policies and other factors, such as evaluation of a plurality of events. Other factors may be described in detail in successive paragraphs. In one implementation, the workflow engine 316 may be controlled by a reviewer or approver authorized by the organization of the computing environment 100. For example, if a security breach is detected by the action engine 312, the reviewer or the approver may decide whether to permanently block the user to access the resource or to provide access to the resource after eliminating the security breach. In another implementation, the workflow engine 316 may be automatically controlled by the action engine 312. For example, the action engine 312 itself decide whether the access to be provided or not.

The action engine 312 may further control the notification and alerting module 318 to provide alert to the owner of the organization of the computing environment 100 based on the data received from the action engine 312. For example, the notification and alerting module 318 may render a popup message on user's device when the action engine 312 detect security breach or compliance breach in the computing environment 100.

The action engine 312 may further control the automated remediation module 320 to provide remedy to the breach of data protection or compliance. For example, the automated remediation module 320 may disconnect the channel utilized by the user breaching the data.

As explained heretofore, the primary function of the unified visibility module 202 is to provide a comprehensive view of the computing environment 100, ensuring that every resource, from databases to virtual machines, is accounted, the unified visibility module 202 may further track or monitor the deployments that led to the creation or modification of these resources. The unified visibility module 202 may also ensure that each resource adheres to the set security and compliance standards. It identifies deviations and takes predefined actions based on the nature of the deviation.

Organizations may utilize the unified visibility module 202 to maintain a historical record of the computing environment 100. This aids in understanding resource evolution, identifying unauthorized changes, and ensuring that every deployment is logged for auditability. The unified visibility module 202 may also be used by organizations to maintain a consistent security and compliance posture. The unified visibility module 202 may automate the process of policy checking, reducing manual effort and ensuring that resources are always in compliance.

The unified visibility module 202 may provide the data related to monitoring of the events to the pattern-based control module 204. The pattern-based control module 204 may comprise a pattern configuration module 322 for defining the scope, conditions, and actions. The pattern configuration module 322 may accept inputs from an owner of the computing environment 100. The pattern configuration module 322 may comprise a plurality of fields, such as targets and schedule 324, conditions 326, and response and action plan 328. The owner or the authorized person may initially configure the plurality of fields of the pattern configuration module 322. For example, the owner may configure a scope of the monitoring the plurality of events. The scope may describe one or more of area, type, range, span of the plurality of events to be monitored by the unified visibility module 202. The owner may further configure conditions such as indicators of the compromise in the plurality of events. The indicators may indicate a condition when an event is considered as malicious activity. In addition, the owner may configure responses for the plurality of events. The response may be configured in terms of an action to be taken if any malicious activity is detected.

The pattern-based control module 204 may comprise a pattern policy engine 330 for monitoring a plurality of sequences of the plurality of events associated with the non-compliance or the malicious behavior. The pattern policy engine 330 may be controlled by the pattern configuration module 322. For example, the pattern policy engine 330 may monitor the plurality of events within the scope defined in the pattern configuration module 322. Further, the pattern policy engine 330 may detect the conditions of the malicious activities based on the indicators defined in the pattern configuration module 322. Post detection, the pattern policy engine 330 may provide a response or action to be taken by the action engine 312 of the unified visibility module 202.

The pattern-based control module 204 may further comprise one or more machine learning models 332 for predicting a pattern of the plurality of sequences detected by the pattern policy engine 330. A machine learning and machine learning models are employed to evaluate and analyze data in certain embodiments, that is not necessarily the case in every embodiment. In some cases, the security platform may also adapt more appropriately or more efficiently to the environment by using a combination of other suitable forms of analysis, including rule-based analysis, algorithm-based analysis, statistical analysis, etc. The pattern of occurrence of the non-compliance or the malicious behavior is utilized for training of the machine learning model 332. In some embodiments, the machine learning models 332 are supervised learning subsystems implementing hyperparametric tuning, in addition to supervised learning. In such way, the machine learning models 332 may be optimized. For example, one or more terms of the objective function and/or the machine learning model 332 may be fine-tuned by varying parameters that are not learned, such as scalar weighting factors.

The pattern policy engine 330 may identify the plurality of patterns of the events according to prediction resulted by the machine learning model 332. For example, the machine learning model 332 may predict that the sequence of the plurality of events results in a malicious activity based on the historical data associated with the malicious activity. The historical data may be obtained from the shared database 208. Thus, learning of each module of the computing environment 100 is shared among other modules of the computing environment 100.

The sequence of the plurality of events associated with the malicious activity may be provided to the pattern policy engine 330 for taking action against the malicious activity. The pattern policy engine 330 may provide the details of the malicious activity to the action engine 312 of the unified visibility module 202. In some embodiments, the pattern policy engine 330 may update the shared database 208 to add data related to the sequence of the events of the malicious activity. Further, the machine learning models 332 may be fine-tuned on the real time data related to the sequence of events of the malicious activity. In such way, if similar sequence of events is identified by the machine learning models 332, the pattern policy engine 330 may immediately inform the action engine 312 of the unified visibility module 202 to take suitable action, such as blocking the event, blacklisting the device related to the malicious activity, and/or providing warning alert to the owner of the computing environment 100.

As explained heretofore, the pattern-based control module 204 identifies "toxic" combinations of conditions across multiple resource types. Further, the pattern-based control module 204 may initiate appropriate responses based on the identified patterns through the action engine 312. In other words, the pattern-based control module 204 continuously analyzes the data from the unified visibility module 202 to identify patterns or combinations of conditions that might indicate a security or compliance risk. The pattern policy engine 330 may further identify complex threats or vulnerabilities that might not be caught by simple resource-level checks. Upon identifying a pattern, the pattern policy engine 330 may trigger a predefined response, which could range from sending an alert to initiating a remediation workflow. The response may be predefined by the owner of the computing environment 100. Organizations may use the pattern-based control module 204 to identify and provide remedy to advanced threats or vulnerabilities. Further, the pattern-based control module 204 may add intelligence to the security and compliance framework. Thus, the pattern-based control module 204 ensures that even sophisticated attack vectors are identified and mitigated.

The pattern-based control module 204 may provide results of identification of pattern of the events to the outcome-based control module 206 through the shared database 208. The outcome-based control module 206 may comprise an outcome configuration module 334 for defining goals & timeline, milestones & metrics, and response & action plan. The outcome configuration module 334 may accept inputs from an owner of the computing environment 100. The outcome configuration module 334 may comprise a plurality of fields, such as goals & timeline 336, milestones & metrics 338, and response & action plan 340. The owner or the authorized person may initially configure the plurality of fields of the outcome configuration module 334. The outcome configuration module 334 may define the outcome goals (objectives) in the goals & timeline 336 field. The outcome goals should be measured with a timeframe specified for the outcome. Further, the outcome should be mapped with metrics that the underlying system has available to the goals and defined in the milestones & metrics 338 field. Breakdown of milestones for each goal that clearly defines at specified time-based intervals what the expected metric value should be. The responses and action plan when milestones are achieved or missed may be defined in the response & action plan 340 field. The metrics can be composed into a formulaic structure with operators and risk weightings applied so that the overall calculation is appropriate to the goal. The responses and actions can be configured with thresholds and be implemented as workflows, notifications/escalations, alerts, or potentially custom automation scripts for an appropriate remediation/response.

The outcome-based control module 206 may comprise an outcome policy engine 342 for performing outcome-based evaluation based on the data stored in the outcome configuration module 334. The outcome policy engine 342 may be controlled by the outcome configuration module 334. For example, the outcome policy engine 342 may acquire a desired output of execution of the plurality of events from the outcome configuration module 334. Further, the outcome policy engine 342 may match an actual output of execution of the plurality of events with the desired output. The outcome policy engine 342 may execute policies that are used to create policy-driven automated responses and actions required to automate outcome-based controls and governance of those controls (ie, escalations, oversight related response and actions, etc.).

The outcome-based control module 206 may comprise a matric calculator 344 for determining a metric value based on the matching of the actual output of the execution with the desired output of the execution. The matric calculator 344 may receive the metrics configuration and performs the automated calculation of each metric anytime there is updated data available for any of the goals/milestones. Further the outcome policy engine 342 may compare the metric value with a pre-defined threshold value and may update the set of policies in the shared database 208 based on the comparison of the metric value with the pre-defined threshold value. The pre-defined threshold value may be defined by the owner of the computing environment and may be dynamically updated in real time based on the result of the pattern-based control module 204. In some implementations, the pre-defined threshold value is the maximum number of occurrences of malicious activities. For example, if the desired outcome is not detected for a particular number of times, the outcome policy engine 342 may confirm that the malicious activity has occurred.

The outcome policy engine 342 may provide a control to the action engine based on the comparison of the metric value with the pre-defined threshold value. In such way, if the desired output is not detected for the pre-defined threshold value, the outcome policy engine 342 may immediately inform the action engine 312 of the unified visibility module 202 to take suitable action, such as blocking the event, blacklisting the device related to the malicious activity, and/or providing warning alert to the owner of the computing environment 100.

The outcome-based control module 206 may operate at a higher level, focusing on the broader goals of the organization's risk, compliance, and security programs. The outcome-based control module 206 may aggregate data from the other modules, such as the unified visibility module 202 and the pattern-based control module 204. Further, the outcome-based control module 206 may measure the aggregated data against predefined metrics to track progress towards the goals. The primary function of the outcome-based control module 206 is to ensure that the organization is on track to achieve its security, risk, and compliance objectives. The outcome policy engine 342 may identify areas where progress is lagging and can trigger actions or escalations based on these insights. Organizations may use the outcome-based control module 206 for strategic oversight to ensure that day-to-day operations align with the broader objectives of the organization. The outcome-based control module 206 further provides a feedback loop that can guide strategy and resource allocation.

Figure 4:
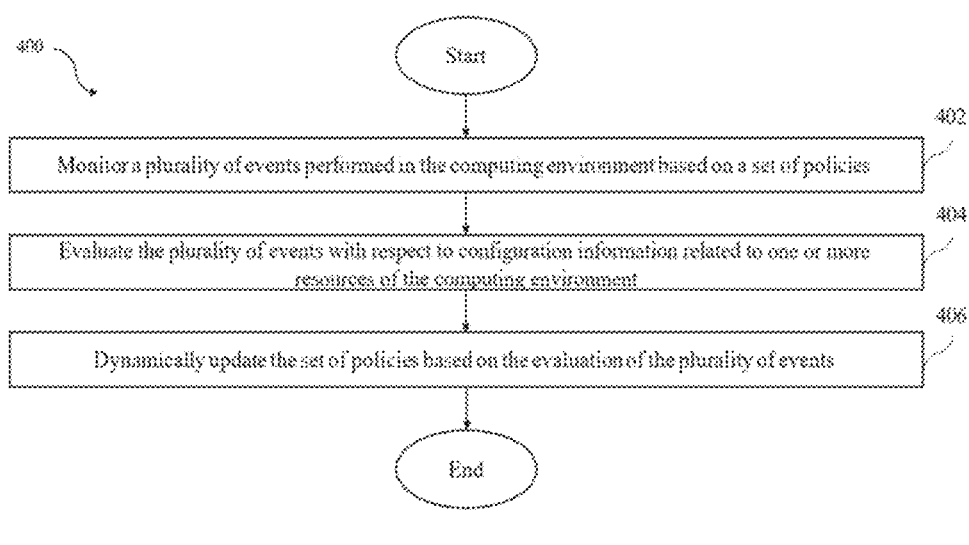
FIG. 4 illustrates a flow chart of a method for monitoring and managing the computing environment, according to an embodiment of the present invention.

FIG. 4 illustrates a flow chart 400 of a method for monitoring and managing the computing environment 100, according to an embodiment of the present invention. The method starts with step 402. At step 402, a plurality of events performed in the computing environment 100 may be monitored based on a set of policies. The plurality of events may comprise at least one of operational events, business events, regulatory events, security events, finops events, and user-initiated events. The set of policies may be defined to identify non-compliance or a malicious behavior associated with the plurality of events. In some implementations, the monitoring may be performed by the unified visibility module 202. The unified visibility module 202 may acquire the set of policies from the shared database 208 and may scan each request received for accessing resources of the computing environment 100.

The plurality of events may be evaluated with respect to configuration information related to the resources of the computing environment 100, at step 404. The configuration information may comprise a pattern configuration and an outcome configuration. The pattern configuration may indicate a scope of the one or more resources, conditions of the non-compliance or the malicious behavior, and actions for each type of the non-compliance or the malicious behavior. The outcome configuration may indicate objectives measured within a timeframe specified for a desired outcome. In some implementations, the pattern configuration and/or the outcome configuration may be defined by an owner of the computing environment 100. The outcome configuration may be updated based on a result of the evaluation of the plurality of events using the pattern configuration. The evaluation may be performed by the pattern-based control module 204 and/or the outcome-based control module 206. For example, the pattern-based control module 204 may utilize the pattern configuration for evaluating the plurality of events and the outcome-based control module 206 may utilize the outcome configuration for evaluating the plurality of events. Process of evaluation of the plurality of events by the pattern-based control module 204 is described in detail successively with reference to FIG. 5. Similarly, process of evaluation of the plurality of events by the outcome-based control module 206 is described in detail successively with reference to FIG. 6.

The set of policies may be updated based on the evaluation of the plurality of events, at step 406. In some implementations, the set of policies may be dynamically updated real time. For example, the pattern-based control module 204 and/or the outcome-based control module 206 may update the set of policies whenever a malicious activity id determined. The updated set of policies may be stored in the shared database 208.

In addition, the unified visibility module 202 may receive a policy update associated with the set of policies whenever there is any change in policy according to business requirements. The policy update may be received from an automated monitoring system and/or an owner of the computing environment. When the policy update is received by the unified visibility module 202, it instantly updates the set of policies in the shared database 208. In such way, any change in the policy may reflect in real time. Furthermore, the set of policies may be updated dynamically using real time data associated with patterns of the behaviors and the desired outcome of the plurality of events. The shared database 208 may be communicatively coupled with one or more third-party systems for obtaining behaviors of the plurality of events.

FIG. 5 illustrates a flow chart 500 of a method for evaluation of the plurality of events by the pattern-based control module 204, according to an embodiment of the present invention. The method starts with step 502. At step 502, a plurality of sequences of the plurality of events associated with the non-compliance or the malicious behavior may be monitored. The monitoring may be performed by the pattern policy engine 330 based on the pattern configuration defined in the pattern configuration module 322. For example, the pattern policy engine 330 may monitor the plurality of events within the scope defined in the pattern configuration module 322. Further, the pattern policy engine 330 may detect the conditions of the malicious activities based on the indicators defined in the pattern configuration module 322.

A pattern of occurrence of the non-compliance or the malicious behavior may be predicted based on the plurality of sequences of the plurality of events, at step 504. The prediction may be performed by the machine learning models 332. The pattern policy engine 330 may identify the plurality of patterns of the events according to prediction resulted by the machine learning model 332.

Further, the set of policies may be updated based on the pattern of occurrence of the non-compliance or the malicious behavior, at step 506. The updated set of policies may be stored into the shared database 208. In such way, the updated policy may be shared with each module of the computing environment 100, such as the unified visibility module 202, the pattern-based control module 204, and the outcome-based control module 206. In some implementations, the pattern of occurrence of the non-compliance or the malicious behavior may be utilized for training of the machine learning model 332.

Figure 6:
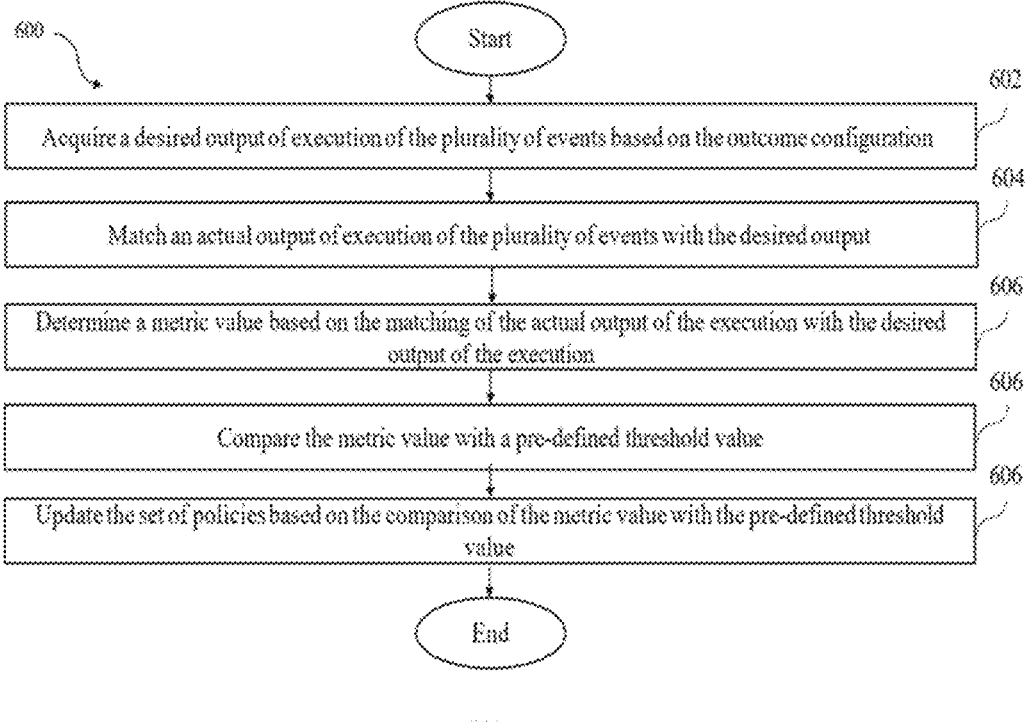
FIG. 6 illustrates a flow chart of a method for evaluation of the plurality of events by the outcome-based control module, according to an embodiment of the present invention.

FIG. 6 illustrates a flow chart 600 of a method for evaluation of the plurality of events by the outcome-based control module 206, according to an embodiment of the present invention. The method starts with step 602. At step 602, a desired output of execution of the plurality of events may be acquired. The desired output may be acquired based on the outcome configuration. The outcome configuration may be stored in the outcome configuration module 334. The outcome configuration may be initially defined by the owner of the computing environment and may be updated dynamically based on the results obtained from the pattern-based control module 204. In some implementations, the outcome policy engine 342 may determine the desired output based on the information obtained from the outcome configuration module 334.

The outcome-based control module 206 may match an actual output of the execution of the plurality of events with the desired outcome, at step 604. The actual output may be obtained by executing the plurality of events actually in real time. Through matching, the outcome policy engine 342 may determine whether the events provide outcome as desired or not.

Further, the matric calculator 344 of the outcome-based control module 206 may determine a matric value based on the matching of the actual output with the desired output, at step 606. The metric value may be a value indicative of successful and desired execution of the plurality of events. For example, the metric value may be zero if the actual output is not matched with the desired output and it may be one of the actual outputs is matched with the desired output. The matric calculator 344 may receive the metrics configuration and performs the automated calculation of each metric anytime there is updated data available for any of the goals/milestones.

The outcome policy engine 342 may aggregate the matric values in form of a matrix. Further, the matric values may be compared with a pre-defined threshold value, at step 608. The pre-defined threshold value may be initially defined by the owner of the computing environment 100. In some implementations, the pre-defined threshold value may be updated in real time based on the results obtained from the pattern-based control module 204. For example, it may be defined in the outcome configuration that a particular number of undesired outputs is allowed in a month. In such examples, if the number of undesired outputs exceeds the particular number of undesired outputs, the outcome policy engine 342 may direct the action engine 312 to take appropriate action, such as blocking the resource request. In some instances, the particular number of undesired outputs allowed may be changed according to the results of the pattern-based control module 204.

Further, the outcome policy engine 342 may update the set of policies based on the comparison of the metric value with the pre-defined threshold value, at step 610. The set of policies may be updated in the shared database 208, so that the updated set of policies may be provided to each module of the computing environment 100.

The invention operates as an integrated system, with each module of the computing environment 100 feeding data to another module. For example, a result of evaluation of the plurality of events with respect to the pattern configuration depends on an output of the evaluation of the plurality of events with respect to the outcome configuration. Similarly, a result of evaluation of the plurality of events with respect to the outcome configuration depends on an output of the evaluation of the plurality of events with respect to the pattern configuration. It starts with granular visibility, moves to resource-specific checks, adds a layer of pattern-based intelligence, and culminates in strategic oversight through outcome-based controls. Together, these modules provide a comprehensive security and compliance solution that is both agile and robust, ensuring that organizations can operate safely in today's dynamic technology landscapes.

The present invention introduces a dual-faceted approach to technology security and compliance through the integration of pattern-based and outcome-based controls. Such controls, while distinct in their mechanisms, collectively aim to provide a comprehensive, adaptive, and forward-looking security and compliance posture for technological ecosystems. The primary purpose of integrating both pattern-based and outcome-based controls within the invention is to ensure a holistic, agile, and proactive approach to security and compliance. This dual-control system is designed to address both the dynamic nature of threats and the strategic objectives of security and compliance. Further, by recognizing and reacting to identifiable patterns or sequences of events, these controls offer immediate responses to potential vulnerabilities or threats. Additionally, the system's ability to recognize patterns enhances over time, refining its predictive capabilities and reducing false positives. Policies are applied based on the context behind recognized patterns, ensuring relevance and precision. These controls ensure that the technological ecosystem consistently maintains a desired state of security and compliance, irrespective of changes or updates. Equipped with self-healing mechanisms, any deviation from the desired state triggers autonomous corrective actions. Beyond high-level oversight, these controls provide deep insights into micro-activities, capturing even the minutest deviations.

In essence, the combined strength of pattern-based and outcome-based controls offers a balanced approach to security and compliance. While pattern-based controls provide the agility to adapt to evolving threats, outcome-based controls ensure alignment with overarching security and compliance goals. Together, they represent a groundbreaking approach in technology security, ensuring that both immediate threats and long-term objectives are addressed with equal precision and efficacy.

The present invention provides the ability to discover resources both in the operating environment (runtime) and during the deployment phase (build-time) is a novel approach. Capturing all changes over time, from resource creation to modifications and removals, provides a depth of visibility previously unattained. Incorporating deep learning techniques for finer pattern recognition in security and compliance is groundbreaking. The ability to invoke human intervention workflows as part of policy-as-code automation ensures a balance between automation and human oversight. The feature of tracking, reporting, and managing security, risk, and compliance outcomes in an automated, data-driven manner is innovative. The ability for controls to self-prioritize based on predefined risk weightings is a novel approach to risk management. The integration of both Pattern-Based and Outcome-Based controls into a single system provides a comprehensive security solution that addresses both proactive threat management and alignment with compliance goals. The system's ability to continuously learn from its environment and adapt its controls accordingly is a pioneering feature. In essence, the invention introduces a suite of features that, when combined, offer a revolutionary approach to technology security and compliance, addressing the challenges of modern dynamic environments in a holistic manner.

Figure 7:
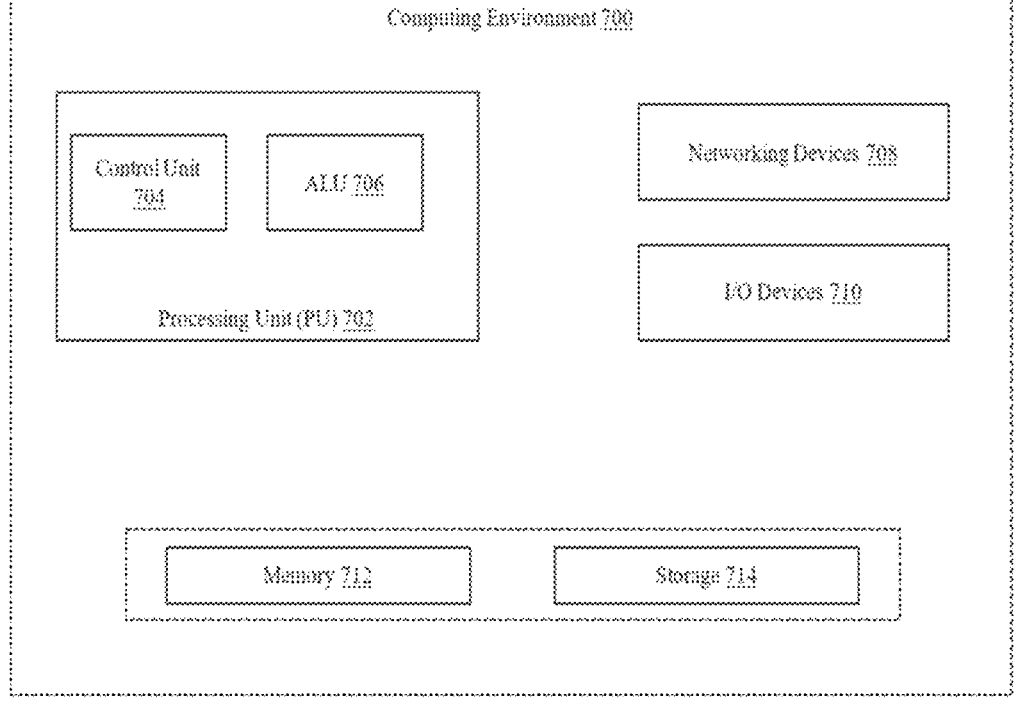
FIG. 7 illustrates an example computing environment implementing a system for monitoring and managing a computing environment, according to an embodiment of the present invention.

FIG. 7 illustrates an example computing environment implementing a system for monitoring and managing a computing environment 700, according to an embodiment of the present invention. As depicted in FIG. 7, the computing environment 700 (similar to the computing environment 100) comprises at least one processing unit 702 that is equipped with a control unit 704 and an Arithmetic Logic Unit (ALU) 706, a plurality of networking devices 708 and a plurality Input output, I/O devices 710, a memory 712, and a storage 714. The processing unit 702 may be responsible for implementing the method described in FIGS. 4-6. For example, the processing unit 702 may in some embodiments be equivalent to the processor of the computing environment 100 described above in conjunction with the FIGS. 1-6. The processing unit 702 is capable of executing software instructions stored in memory 712. The processing unit 702 receives commands from the control unit 704 in order to perform its processing. Further, any logical and arithmetic operations involved in the execution of the instructions are computed with the help of the ALU 706.

The computer program is loadable into the processing unit 702, which may, for example, be comprised in an electronic apparatus. When loaded into the processing unit 702, the computer program may be stored in the memory 712 associated with or comprised in the processing unit 702. According to some embodiments, the computer program may, when loaded into and run by the processing unit 702, cause execution of method steps according to, for example, any of the methods illustrated in FIGS. 4-6 or otherwise described herein.

The overall computing environment 700 may be composed of multiple homogeneous and/or heterogeneous cores, multiple CPUs of different kinds, special media and other accelerators. Further, the plurality of processing unit 702 may be located on a single chip or over multiple chips.

The algorithm comprising of instructions and codes required for the implementation are stored in either the memory 712 or the storage or both. At the time of execution, the instructions may be fetched from the corresponding memory 712 and/or storage, and executed by the processing unit 702.

In case of any hardware implementations various networking devices 708 or external I/O devices 710 may be connected to the computing environment to support the implementation through the networking devices 708 and the I/O devices 710.

Figure 8:
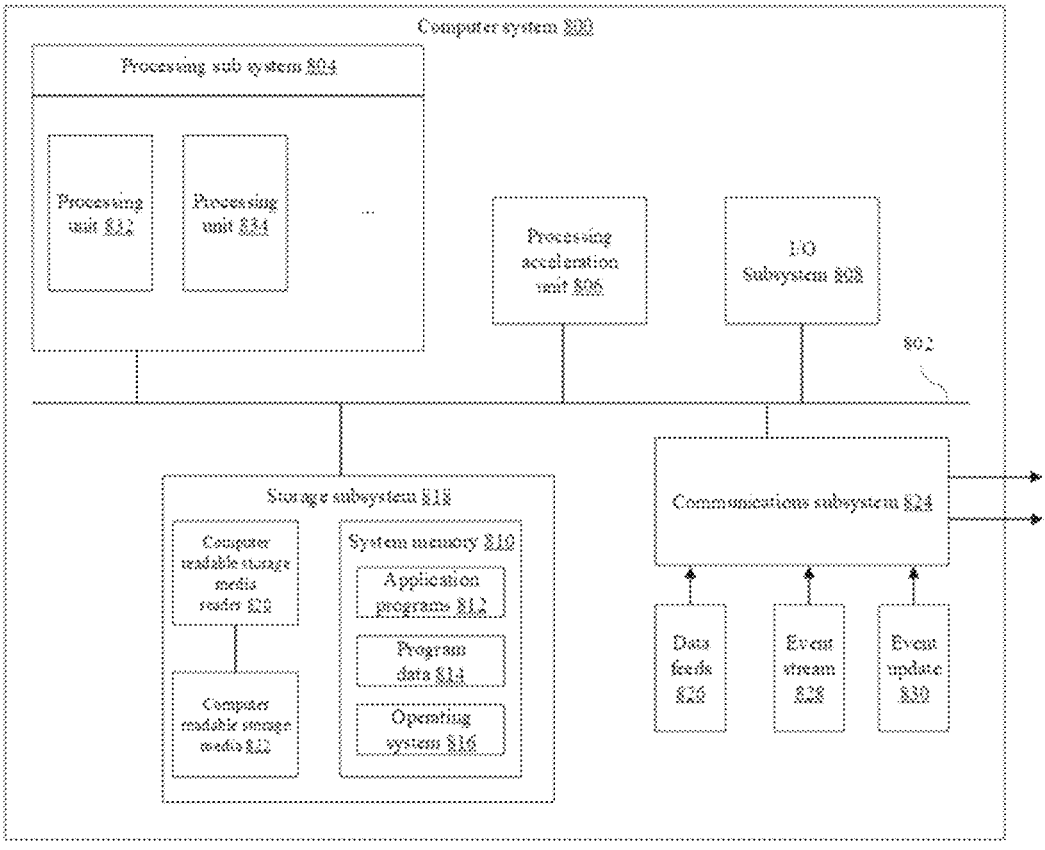
FIG. 8 illustrates a block diagram of an example computer system 800, according to an embodiment of the present invention.

FIG. 8 illustrates a block diagram of an example computer system 800, according to an embodiment of the present invention. For example, in some embodiments, computer system 800 may be used to implement any of systems, subsystems, and components described herein. For example, multiple host machines may provide and implement processes of a computing environment 100 as described herein. Computer systems such as computer system 800 may be used as host machines. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. The storage subsystem 818 may include non-transitory computer-readable storage media including a computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on the computer-readable storage media 822. In various embodiments, the processing units can execute a variety of programs or code instructions and can maintain multiple concurrently executing programs or processes. At any given time, some or all of the program code to be executed can be resident in system memory 810 and/or on the computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

The I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 818 provides a repository or data store for storing information and data that is used by computer system 800. The storage subsystem 818 provides a tangible non-transitory computer-readable storage medium for storing the basic programming and data constructs that provide the functionality of some embodiments. The storage subsystem 818 may store software (e.g., programs, code modules, instructions) that when executed by processing subsystem 804 provides the functionality described above. The software may be executed by one or more processing units of processing subsystem 804. The storage subsystem 818 may also provide a repository for storing data used in accordance with the teachings of this disclosure.

The storage subsystem 818 may include one or more non-transitory memory devices, including volatile and non-volatile memory devices. The storage subsystem 818 is shown to be depicting, the system memory 810 and the computer-readable storage media 822, in FIG. 8. System memory 810 may include a number of memories including a volatile main random-access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random-access memory (SRAM), dynamic random-access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

In certain embodiments, software instructions or code implementing the computing environment 100, as described herein, may be executed in system memory 810.

Computer-readable storage media 822 may store programming and data constructs that provide the functionality of some embodiments. Computer-readable storage media 822 may provide storage of computer-readable instructions, data structures, program modules, and other data for computer system 800. Software (programs, code modules, instructions) that, when executed by processing subsystem 804 provides the functionality described above, may be stored in the storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magneto-resistive RAM (MRAM) SSDs, and hybrid SSDs that use a combination of DRAM and flash memory-based SSDs.

In certain embodiments, the storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

The embodiments disclosed herein can be implemented through at least one software program running on at least one hardware device and performing network management functions to control the elements. The elements shown in FIG. 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user's computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer-readable media such as RAMs, ROMs, flash memory, EEPROMs, optical devices (CD or DVD), hard drives, and floppy drives, or any suitable device. The computer-executable component can be a processor but any suitable dedicated hardware device can (alternatively or additionally) execute the instructions.

As a person skilled in the art will recognize from the previous detailed description and the figures and claims, modifications and changes can be made to the embodiments of the invention without departing from the spirit and scope of this invention.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the embodiments is by no means limited by these specific examples. Numerous variations, whether explicitly given in the specification or not, such as differences in structure, dimension, and use of material, are possible.

We claim:

1. A method for monitoring and managing a computing environment, comprising:

monitoring a plurality of events performed in the computing environment based on a set of policies, wherein the set of policies is defined to identify non-compliance or a malicious behavior associated with the plurality of events;

accessing and performing a resource-level policy evaluation on the set of policies acquired from a shared database, wherein the resource-level policy evaluation is configured to evaluate the set of policies based on resource of the computing environment;

receiving a data associated with the non-compliance or the malicious behavior of the plurality of events from a plurality of third party tools or from other third party devices;

providing an additional security event and an incident data on the set of policies after ingesting the received data associated with the non-compliance or the malicious behavior of the plurality of events from a plurality of third party tools or from other third party devices;

dynamically updating the set of policies in the shared database on a real-time basis based on the received data;

providing the plurality of events based on the updated set of policies to evaluate the plurality of events with respect to a dual configuration information related to one or more resources of the computing environment, wherein the dual configuration information comprises:

a pattern configuration indicating a scope of the one or more resources, conditions of the non-compliance or the malicious behavior, and actions for each type of the non-compliance or the malicious behavior;

an outcome configuration indicating objectives measured within a timeframe specified for a desired outcome, wherein the outcome configuration is dynamically updated based on the evaluation of the plurality of events using the pattern configuration;

acquiring a desired output of execution of the plurality of events based on the outcome configuration;

matching an actual output of execution of the plurality of events with the desired output;

determining a metric value based on the matching of the actual output of the execution with the desired output of the execution using a matric calculator, wherein the metric calculator is configured to automatically perform the calculation of the metric value when there is any update made the received data or the set of policies;

comparing the metric value with a pre-defined threshold value, wherein if the metric value is not within the pre-defined threshold values actions are initiated, including blocking the event, blacklisting device related to the malicious activity, and/or providing warning alert to owner of the computing environment; and dynamically updating the set of policies based on the real time data associated with patterns of the malicious behaviors and the desired outcome of the plurality of events wherein the updated set of policies are stored in a shared database of the computing environment for future reference to avoid the occurrence of non-compliance and malicious behavior before it occurs.

2. The method according to claim 1, wherein the plurality of events includes, but is not limited to, operational events, business events, regulatory events, security events, finops events, and user-initiated events.

3. The method according to claim 1, wherein the pattern configuration and the outcome configuration are defined by an owner of the computing environment.

4. The method according to claim 1, further comprising:

monitoring a plurality of sequences of the plurality of events associated with the non-compliance or the malicious behavior based on the pattern configuration;

predicting a pattern of occurrence of the non-compliance or the malicious behavior based on the plurality of sequences of the plurality of events; and updating the set of policies based on the pattern of occurrence of the non-compliance or the malicious behavior.

5. The method according to claim 4, wherein the pattern of occurrence of the non-compliance or the malicious behavior is utilized for training of a data model.

6. The method according to claim 1, wherein the metric value is calculated within a specified time period.

7. The method according to claim 1, further comprising:

receiving a policy update associated with the set of policies from an automated monitoring system or an owner of the computing environment; and updating the set of defined policies based on the policy update.

8. The method according to claim 1, wherein the shared database is communicatively coupled with one or more third-party systems for obtaining behaviors of the plurality of events.

9. The method according to claim 1, wherein a result of evaluation of the plurality of events with respect to the pattern configuration depends on an output of the evaluation of the plurality of events with respect to the outcome configuration.

10. The method as claimed in claim 1, wherein a result of evaluation of the plurality of events with respect to the outcome configuration depends on an output of the evaluation of the plurality of events with respect to the pattern configuration.

11. A system for monitoring and managing a computing environment, comprising:

a plurality of computing systems interconnected through a network;

at least a user device and a data management server, wherein the data management server comprises:

at least one data processor configured to monitor and manage the network;

a unified visibility module configured to access a set of policies stored in a shared database to perform a resource-level policy evaluation on the set of policies acquired from the shared database, wherein the resource-level policy evaluation is configured to evaluate the set of policies based on resource of the computing environment, and receive additional inputs from an enrichment service module to provide an additional security event and an incident data;

dynamically updating the set of policies in the shared database on a real-time basis based on the received data;

monitor a plurality of events performed in the computing environment based on the set of policies, wherein the set of policies is defined to identify non-compliance or malicious behavior associated with the plurality of events;

receive a data associated with the non-compliance or the malicious behavior of the plurality of events from a plurality of third party tools, wherein the plurality of third party tools are operatively coupled with the unified visibility module for incorporating the evaluated resource-level policy with the plurality of third party tools;

update the set of policies in the shared database based on the data and the information;

provide the plurality of events based on the updated set of policies to evaluate the plurality of events with respect to a dual configuration information provided by a pattern-based control module, and an outcome based control module related to one or more resources of the computing environment, wherein the dual configuration information utilizes:

the pattern-based control module configured to provide a pattern configuration indicating a scope of the one or more resources, conditions of the non-compliance or the malicious behavior, and actions for each type of the non-compliance or the malicious behavior; and the outcome based control module configured to provide an outcome configuration, indicating objectives measured within a timeframe specified for a desired outcome, wherein the outcome configuration is dynamically updated based on the evaluation of the plurality of events using the pattern configuration;

acquiring a desired output of execution of the plurality of events based on the outcome configuration;

matching an actual output of execution of the plurality of events with the desired output;

determining a metric value based on the matching of the actual output of the execution with the desired output of the execution using a matric calculator, wherein the metric calculator is configured to automatically perform the calculation of the metric value when there is any update made the received data or the set of policies;

comparing the metric value with a pre-defined threshold value, wherein if the metric value is not within the pre-defined threshold values actions are initiated, including blocking the event, blacklisting device related to the malicious activity, and/or providing warning alert to owner of the computing environment; and dynamically update the set of policies based on the real time data associated with patterns of the malicious behaviors and the desired outcome of the plurality of events, wherein the updated set of policies are stored in a shared database of the computing environment for future reference to avoid the occurrence of non-compliance and malicious behavior before it occurs.

12. The system according to claim 11, wherein the plurality of events, including, but is not limited to, operational events, business events, regulatory events, security events, finops events, and user-initiated events.

13. The system according to claim 11, wherein the pattern configuration and the outcome configuration are defined by an owner of the computing environment.

14. The system according to claim 11, wherein the one or more data processors are configured to:

monitor a plurality of sequences of the plurality of events associated with the non-compliance or the malicious behavior based on the pattern configuration;

predict a pattern of occurrence of the non-compliance or the malicious behavior based on the plurality of sequences of the plurality of events; and update the set of policies based on the pattern of occurrence of the non-compliance or the malicious behavior.

15. The system according to claim 14, wherein the pattern of occurrence of the malicious behavior is utilized for training a data model.

16. The system according to claim 11, wherein the metric value is calculated within a specified time period.

17. The system according to claim 11, wherein the one or more data processors are configured to:

receive a policy update associated with the set of defined policies from an automated monitoring system or an owner of the computing environment; and update the set of defined policies based on the policy update.

18. The system according to claim 11, wherein the shared database is communicatively coupled with one or more third-party systems for obtaining behaviors of the plurality of events.

19. The system according to claim 11, wherein a result of evaluation of the plurality of events with respect to the pattern configuration depends on an output of the evaluation of the plurality of events with respect to the outcome configuration.

20. The system according to claim 11, wherein a result of evaluation of the plurality of events with respect to the outcome configuration depends on an output of the evaluation of the plurality of events with respect to the pattern configuration.

* * * * *